United States Patent Office 3,840,635
Patented Oct. 8, 1974

3,840,635
PROCESS FOR PRODUCING SHAPED
ARTICLES OF POLYAMIDES
Takeo Shima, Hiroo Inata, and Shoji Kawase, Iwakuni,
Japan, assignors to Teijin Limited, Osaka, Japan
No Drawing. Filed June 12, 1972, Ser. No. 262,156
Claims priority, application Japan, June 15, 1971,
46/42,678
Int. Cl. B29c 25/00
U.S. Cl. 264—236      10 Claims

ABSTRACT OF THE DISCLOSURE

A process for preparing shaped articles of polyamides, which comprises shaping a polyamide having 1,4-dihydroterephthalic acid units in the polymer molecule, wherein during or after the shaping operation, the polyamide is heated to a temperature of at least 100° C. thereby to give a shaped article of elevated softening point.

---

This invention relates to a process for producing shaped articles of polyamides, and more specifically, to a process for producing polyamide shaped articles of improved thermal stability by elevating the softening temperature of a polyamide during or after the fabrication of it into a shaped article while retaining the ease of shaping.

Aromatic polyamides such as polyhexamethylene terephthalamide or poly-m-phenylene isophthalamide have been known as thermally stable polyamides, but because of their high melting points close to their decomposition points, they are difficult to melt shape.

On the other hand, a number of polyamides such as polyhexamethylene adipamide or poly-ε-caproamide are known as polyamides suitable for melt shaping, but they are inferior in thermal stability to the above-mentioned aromatic polyamides because of their low softening points. In these polyamides, the ease of melt shaping does not stand compatible with excellent thermal stability.

Accordingly, it is an object of this invention to provide a process for producing shaped articles of improved thermal stability which can be easily shaped into articles.

It has now been found that a polyamide containing 1,4-dihydroterephthalic acid units in the polymer molecule increases in softening point when heated to a temperature of at least 100° C. but below its heat decomposition temperature, and that by performing this heating during or after its shaping, the polyamide can be shaped easily at a relatively low temperature and the softening point of the polymer after shaping can be elevated thereby to improve the thermal stability of the shaped article.

According to this invention, there is provided a process for producing shaped articles of polyamides, which is characterized in that a polyamide containing 1,4-dihydroterephthalic acid units in the polymer molecule is heated to a temperature of at least 100° C. but below its heat decomposition temperature.

The polyamide used in the invention is a novel polymer in that it contains 1,4-dihydroterephthalic acid units

The polyamide used in the invention is a homopolyamide composed of the recurring units of a 1,4-dihydroterephthalic acid amide of the formula

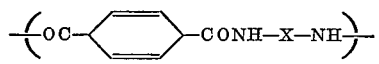

wherein X is a divalent organic residue of the diamine or a copolyamide containing 1,4-dihydroterephthalic acid units of the formula

in the polymer molecule.

The above homopolyamide can be prepared by polycondensing a mixture or salt of 1,4-dihydroterephthalic acid with a diamine of the formula $H_2N-X-NH_2$, wherein X is the same as defined above. A part or whole of the 1,4-dihydroterephthalic acid can be replaced by its functional derivative such as an acid halide or ester.

The copolyamide can be obtained, for example, by the following methods.

(A) Polycondensation of a mixture or salt of a mixed dicarboxylic acid consisting of 1,4-dihydroterephthalic acid and other dicarboxylic acid with a diamine (a part or whole of the dicarboxylic acid may be replaced by a functional derivative of the dicarboxylic acid such as an acid halide, acid anhydride or ester).

(B) Polycondensation or ring-opening polymerization of omega-aminocarboxylic acid or its lactam together with 1,4-dihydroterephthalic acid (usually in the form of a mixture or salt with a diamine) (a part or whole of the 1,4-dihydroterephthalic acid may be replaced by its functional derivative).

Where the polyamide containing 1,4-dihydroterephthalic acid units is a copolyamide, it is preferred that the content of the 1,4-dihydroterephthalic acid units should be at least 5 mol percent, especially at least 30 mol percent, based on the total carboxylic acid component of the polyamide. The range of 5 to 30 mol percent is preferred where the other component is terephthalic acid or adipic acid. In other cases, more than 30 mol percent is preferred. The carboxylic acid component is meant to include dicarboxylic acids, aminocarboxylic acids and lactams.

The amount of the 1,4-dihydroxyterephthalic acid units contained in the copolyamide can be controlled according to the ratio of the materials to be fed.

In the production of polyamides containing 1,4-dihydroterephthalic acid units, there can be used diamines, dicarboxylic acids, aminocarboxylic acids and lactams all of which have been known to be usable for production of polyamides.

Examples of the diamines include ethylene diamine, trimethylene diamine, tetramethylene diamine, hexamethylene, diamine, octamethylene diamine, pentamethylene diamine, heptamethylene diamine, nonamethylene diamine, decamethylene diamine, undecamethylene diamine, dodecamethylene diamine, α,α'-dimethylhexamethylene diamine, cyclohexylene diamine, p,p'-di(aminocyclohexyl) methane, piperazine, m-xylylene diamine, p-xylylene diamine, N,N'-diethylethylene diamine, N,N'-dimethylethylene diamine, N,N'-diethylhexamethylene diamine, N,N'-dimethylhexamethylene diamine, m-phenylene diamine, p-phenylene diamine, and 2-methylpiperazine.

Examples of the dicarboxylic acids that can be used include succinic acid, adipic acid, suberic acid, sebacic acid, azelaic acid, hexahydroterephthalic acid, hexahydroisophthalic acid, terephthalic acid, isophthalic acid, naphthalenedicarboxylic acid, methylterephthalic acid, methylisophthalic acid, 4,4'-diphenyldicarboxylic acid, diphenylether dicarboxylic acid, diphenylsulfonedicarboxylic acid, diphenylketonedicarboxylic acid, diphenoxyethanedicarboxylic acid and diphenylethanedicarboxylic acid.

Examples of the aminocarboxylic acids include ε-aminocapronic acid, p-aminobenzoic acid, 7-aminoenanthoic acid, 9-aminononaic acid, ω-aminoundecanoic acid, and p- and m-aminomethylbenzoic acids.

Examples of the lactams include ε-caprolactam, φ-enantholactam, ω-laurolactam and η-capryllactam.

The production of the polyamide containing 1,4-dihydroterephthalic acid units can be performed by using any desired polymerization method such as melt polymerization, solution polymerization, interfacial polymerization or solid phase polymerization, but the melt polymerization method is especially preferred for its simplicity.

The polymerization may be carried in the presence of a branching agent such as polycarboxylic acids or polyamines having three or more functional groups, or a molecular weight regulating agent such as monocarboxylic acids or monoamines.

The polyamides containing 1,4-dihydroterephthalic acid units, as used in the present invention, have far lower melting points than the polyamides known to have good thermal stability, for example polyhexamethylene terephthalamide, and can be fabricated easily. The polyamide containing 1,4-dihydroterephthalic acid units can have a softening point of not more than 300° C. which allows easy frabrication although varying according to the content of 1,4-dihydroterephthalic acid, the type of the diamine component, the types of the comonomers and the polymerization conditions.

By heating the polyamides used in this invention, its softening point can be increased by at least 10° C.

Polyhexamethylene terephthalamide known to be a typical polyamide of good thermal stability has a softening point of about 340° C., and can hardly be melt-shaped. By contrast, a polyamide obtained by melt polymerization of a nylon salt of hexamethylene diamine and 1,4-dihydroterephthalic acid at 260° C. for 20 minutes has a softening point of 155° C., and can be easily melt-shaped. When this polyamide having a softening point of 155° C. is heated from 110° C. to 250° C. in the course of 3 hours and maintained at 250 C. for 2 hours, the softening point thereof finally reaches higher than 300° C. Since the softening point of the polyamide increases gradually with a rise in the heating temperature during this heating operation, the polyamide can be subjected to this heat-treatment without being softened.

When the polyamide of the invention having a softening point of 155° C. is heated, for example, at 260° C. for 40 minutes, it is in the softened state in the initial stage of heating. The softening temperature gradually increases, and at the time of completion of heating in 40 minutes, the softening point of the polyamide becomes higher than 260° C. Thus, the polyamide is not softened at 260° C. As described above, polyamides of various softening points can be obtained by varying the content of the 1,4-dihydroterephthalic acid units, the type of the diamine, its content, the type and content of the other carboxylic acid component, or the polymerization conditions. In any case, by the inclusion of the 1,4-dihydroterephthalic acid units, the polyamides obtained have softening points and melting points which allow easy melt-shaping, but their softening points can be elevated by heating to a temperature of at least 100° C.

Since the polyamide used in this invention has the above-mentioned properties, it is possible to melt-shape it by heating it to a temperature higher than the initial softening point (higher than the melting point). The softening point is elevated by heating the polyamide during or after the shaping operation, which in turn contributes to the improvement of its thermal stability.

Since the softening point of the polyamide used in this invention increases with the passage of time when it is heated to a temperature of at least 100° C., it goes without saying that the melt-polymerization to form the polyamide used in this invention should be completed while the softening point of the polyamide is such as to allow melt-shaping.

The polyamide used in this invention may contain an additive such as a light or heat stabilizer an antioxidant, an antistatic agent, a pigment (such as titanium oxide), a filler (such as glass fibers) or a dye. These additives may be incorporated before, during or after the preparation of the polyamide.

The polyamide used in this invention can be fabricated into any desired articles such as fibers, films, sheets, beads or pellets by any known method of fabrication. Examples of the typical fabricating methods include melt-spinning, dry-spinning, wet-spinning for production of fibers, melt-, dry-, and wet-film making methods for production of films or sheets, and casting, injection molding, extrusion molding, calendering, pressing, etc. for production of other fabricated articles.

Although the heating of the polyamide can be carried out either during or after the shaping operation, it is preferred that the fibers, films, sheets, beads, pellets, or other fabricated products of the polyamide should be heated to a temperature of at least 100° C. but below its thermal decomposition temperature. If the temperature is constant, the softening point of the polyamide increases to a greater degree with long periods of heating time. When the heating time is kept constant, the softening point increases to a greater degree with higher heating temperatures.

If the heating conditions are the same, the softening point of the polyamide increases to a greater degree with higher contents of the amide of 1,4-dihydroterephthalic acid. Where the content of the 1,4-dihydroterephthalic acid amide is higher, there is an outstanding rise in softening point at a heating temperature of 250° C. or more even if the heating time is about 30 seconds.

Suitable heating conditions can be easily determined by preliminary experiments, although differing according to the desired extent of elevation of the softening point, the content of the 1,4-dihydroterephthalic acid amide content of the polymer, etc. When it is desired to elevate the heating temperature to above the softening point of the polymer being heat-treated, it is preferable to heat-treat the shaped article as it is placed in a mold. Needless to say, when it is heated at a temperature lower than the softening point of the polymer, there is no such necessity.

If the heating temperature is below 100° C., it is imposssible to elevate the softening point of the polyamide, and if it is above the thermal decomposition temperature, the polyamide undesirably decomposes during heating.

According to the process of this invention, the polyamide can be melt-shaped at a relatively low temperature, and by heating the shaped article after shaping, the softening point of the shaped article is elevated, thus bringing about improvement in its thermal stability.

It has not been fully elucidated why the softening point of the polymer increases by heat-treatment. It is however assumed that this phenomenon has some relation with the fact that at the time of heat-treatment, a part of the 1,4-dihydroterephthalamide component of the polymer undergoes dehydrogenation during heating and changes into a terephthalamide component. Since severe heating conditions have been found to render the polymer insoluble in a solvent, it is thought that a cross-linking reaction occurs gradually.

The invention will be illustrated by the following Examples, in which all parts are by weight. The reduced viscosity ($\eta_{sp}/C$) is a value measured at 35° C. with respect to a solution of polymer in sulfuric acid in a concentration of 1.2 g. polymer/100 ml. of solvent. The softening point of the polyamide was measured by a penetrometer.

EXAMPLE 1

A three-necked flask equipped with a stirrer, a nitrogen inlet and a distillation outlet was charged with 84 parts of 1,4-dihydroterephthalic acid, 58 parts of hexamethylene diamine and 300 parts of water, and these compounds were reacted at 95° C. for 30 minutes in an atmosphere of nitrogen. The temperature was then gradually raised to evaporate off water.

After removal of water, the temperature was raised to 260° C., and the reaction was continued at 260° C. for 20 minutes. The resultant polymer had a reduced viscosity of 0.33 and a softening point of 155° C.

The polymer was injection molded at 190° C., and the shaped article was further heated for 20 minutes at 260°

C. as it was placed in a mold. The molded article was cooled and withdrawn from the mold. It was found that the polymer had a reduced viscosity of 0.45 and a softening point of 241° C.

When the molded article was further heated at 200° C. for 4 hours, the softening point of the polymer increased to 274° C. The polymer was then soluble in sulfuric acid, but was insoluble in an organic solvent such as o-cresol, m-cresol or o-chlorophenol.

The above polymer having a softening point of 155° C. was rolled into a sheet at 110° C. at a pressure of 100 kg./cm.² G. In the course of three hours, the heating temperature was raised from 110° C. to 250° C., and the sheet was further heat-treated at 250° C. for 2 hours. The softening point of the polymer increased to more than 300° C., and a tough sheet insoluble in various solvents was obtained.

EXAMPLE 2

The same reactor as used in Example 1 was charged with 43.0 parts of dimethyl 1,4-dihydroterephthalate, 18.5 parts of dimethyl terephthalate, 36.5 parts of hexamethylene diamine, and 100 parts of toluene, and these compounds were heated to 100 to 150° C. The methanol formed was removed from the distillation outlet. When substantially all of the methanol left the reactor, the reaction temperature was raised, and the toleuene was evaporated off. After the removal of toluene the reaction was performed at 200° C. for 30 minutes. The resulting polymer had a reduced viscosity of 0.31 and a softening point of 167° C.

This polymer was fabricated by casting at 200° C., and the fabricated article was heated for 20 minutes at 260° C. as it was placed in a mold, and after cooling, withdrawn from the mold. The polymer was found to have a reduced viscosity of 0.44 and a softening point of 237° C.

When the fabricated article was further heated in the course of 2 hours from 200° C. to 270° C. and maintained at 270° C. for one hour, the softening point of the polymer increased to more than 300° C. The reduced viscosity was 1.52.

EXAMPLE 3

The same reactor as used in Example 1 was charged with 84 parts of 1,4-dihydroterephthalic acid (50 mole percent as a copolymer component), 58 parts of hexamethylene diamine, 57 parts of ε-caprolactam (50 mol percent as a copolymer component) and 300 parts of water, and the reaction was performed for 30 minutes at 95° C. in an atmosphere of nitrogen. The temperature was gradually raised, and water was evaporated off.

After removal of water, the temperature was raised to 260° C., and the reaction was continued for 30 minutes at 260° C. The resultant polymer had a reduced viscosity of 0.45 and a softening point of 198° C.

The polymer was rolled into a film at 150° C. and a pressure of 100 kg./cm.² G. The film was heated for one hour at 170° C., and for 3 hours at 200° C. The resultant film had a softening point of 248° C.

EXAMPLES 4 TO 11

The same reaction apparatus as usd in Example 1 was charged with the starting materials shown in Table 1, followed by addition of 300 parts of water. Water was evaporated off by raising the temperature gradually in an atmosphere of nitrogen.

A prepolymer was then produced by performing the reaction in accordance with the conditions shown in Table 1. The prepolymer was fabricated and heat-treated under the conditions shown in Table 1.

The results obtained are shown in Table 1.

TABLE 1

| | Materials | | Proportion of other carboxylic component¹ (mol percent) | Polymer | | | | | Properties of the heat-treated polymers | |
|---|---|---|---|---|---|---|---|---|---|---|
| | | | | Productional conditions | | Physical properties | | | | |
| Example | Types | Amounts (parts) | | Temp. (° C.) | Time (min.) | η sp/C | Softening point (° C.) | Heat-treating conditions | η sp/C | Softening point (° C.) |
| 4 | 1,4-dihydroterephthalic acid<br>Decamethylene diamine | 33.6<br>34.5 | 0 | 260 | 15 | 0.40 | 81 | 200° C. ×2 hrs. (in a mold). | 1.20 | 233 |
| 5 | 1,4-dihydroterephthalic acid<br>m-Xylenediamine | 23.6<br>27.2 | 0 | 265 | 15 | (²) | 181 | Heated from 170° C. to 240° C. over 3 hours. | (²) | >300 |
| 6 | 1,4-dihydroterephthalic acid<br>Adipic acid<br>Hexamethylene diamine | 28.2<br>10.5<br>28.0 | 30 | 260 | 15 | 0.43 | 215 | 200° C.×2 hrs. and further 250° C.×1 hr. | 1.71 | >300 |
| 7 | 1,4-dihydroterephthalic acid<br>Sebacic acid<br>Hexamethylene diamine | 31.5<br>12.6<br>29.2 | 25 | 260 | 20 | 0.49 | 95 | 200° C.×3 hrs. (in a mold). | 1.27 | 246 |
| 8 | 1,4-dihydroterephthalic acid<br>p-Aminobenzoic acid<br>Decamethylenediamine | 34.9<br>7.1<br>35.8 | 20 | 250 | 20 | 0.31 | 247 | 220° C.×2 hrs. and further 260° C.×1 hr. | 0.76 | >300 |
| 9 | 1,4-dihydroterephthalic acid<br>2,6-naphthalene-dicarboxylic acid<br>Nonamethylene diamine | 33.3<br>4.8<br>34.8 | 10 | 260 | 20 | 0.43 | 116 | Heated from 100° C. to 210° C. over 3 hours. | 0.95 | 231 |
| 10 | 1,4-dihydroterephthalic acid<br>4,4'-diphenyl-dicarboxylic acid<br>Nonamethylene diamine | 32.3<br>11.6<br>37.9 | 20 | 260 | 20 | 0.47 | 235 | 210° C.×2 hrs. and further 260° C.×1 hr. | (²) | >300 |
| 11 | 1,4-dihydroterephthalic acid<br>Terephthalic acid<br>Decamethylene diamine | 3.2<br>36.7<br>41.3 | 92 | 280 | 10 | 0.31 | 268 | 260° C.×2 hrs | 0.85 | 279 |

¹ The proportion of the carboxlyic acid other than 1,4-dihydroterephthalic acid in the total carboxlyic acid component.

² ηsp/C was not measurable because of the insolubility of polymer in sulfuric acid.

What is claimed is:

1. A process for producing shaped articles of polyamides having an elevated softening point and improved heat resistance comprising melt shaping at a temperature above the initial softening point of said polyamide which is selected from the group consisting of (a) a homopolyamide composed of recurring units of a 1,4-dihydroterephthalic acid amide of the formula

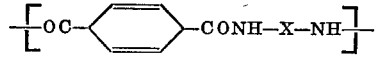

wherein X is a divalent organic residue of a diamine and the acid halides and esters thereof; and (b) copolyamide containing at least 5 mol percent, based on the total carboxylic acid component of the polyamide, of 1,4-dihydroterephthalic acid units of the formula

said copolyamide prepared by polymerizing said 1,4-dihydroterephthalic acid units or the acid halide or ester derivatives thereof with a diamine and a member selected from the group consisting of dicarboxylic acids, omega-aminocarboxylic acid and lactams; and heating said polyamide at a temperature of at least 100° C. but below the heat decomposition temperature of said polyamide during a period of at least about 30 seconds to thereby elevate the softening temperature of said polyamide by at least 10° C. with the proviso that said polyamide is prepared under such conditions that its softening point before said heat treatment will be substantially below its heat decomposition temperature.

2. The process of claim 1, wherein said heating is carried out at 100° C. to 290° C.

3. The process of claim 1, wherein said polyamide contains hexamethylene diamine, decamethylene diamine or xylylene diamine as a diamine component.

4. The process of claim 1, wherein said polyamide contains terephthalic acid, isophthalic acid, adipic acid, sebacic acid, aminobenzoic acid, ε-aminocaproic acid, dipenyldicarboxylic acid or naphthalenedicarboxylic acid as a dicarboxylic acid component.

5. The process of claim 1, wherein said polyamide contains ε-caprolactam units.

6. The process of claim 1 wherein said diamine is selected from the group consisting of ethylene diamine, trimethylene diamine, tetramethylene diamine, hexamethylene diamine, octamethylene diamine, pentamethylene diamine, heptamethylene diamine, nonamethylene diamine, decamethylene diamine, undecamethylene diamine, dodecamethylene diamine, α,α'-dimethylhexamethylene diamine, cyclohexylene diamine, p,p'-di(aminocyclohexyl) methane, piperazine, m-xylylene diamine, p-xylylene diamine, N,N'-diethylethylene diamine, N,N'-dimethylethylene diamine, N,N' - diethylhexamethylene diamine, N, N' - dimethylhexamethylene diamine, m - phenylene diamine, p-phenylene diamine, and 2-methylpiperazine.

7. The process of claim 1 wherein said dicarboxylic acid is selected from the group consisting of succinic acid, adipic acid, suberic acid, sebacic acid, azelaic acid, hexahydroterephthalic acid, hexahydroisophthalic acid, terephthalic acid, isophthalic acid, naphthalenedicarboxylic acid, methylterephthalic acid, methylisophthalic acid, 4,4'-diphenyldicarboxylic acid, diphenylether dicarboxylic acid, diphenylsulfonedicarboxylic acid, diphenylketonedicarboxylic acid, diphenoxyethanedicarboxylic acid and diphenylethanedicarboxylic acid.

8. The process of claim 1 wherein said aminocarboxyliic is selected from the group consisting of ε-aminocapronic acid, p-aminobenzoic acid, 7-aminoethanoic acid, 9-aminononaic acid, ω-aminoundecanoic acid, and p- and m-aminomethylbenzoic acids.

9. The process of claim 1 wherein said lactam is selected from the group consisting of ε-caprolactam, φ-enantholactam, ω-laurolactam and η-capryllactam.

10. The process of claim 1 wherein said copolyamide contains at least 30 mol percent of said 1,4-dihydroterephthalic acid units.

References Cited
UNITED STATES PATENTS

| | | | |
|---|---|---|---|
| 3,239,490 | 3/1966 | Gee et al. | 260—78 L |
| 3,546,329 | 12/1970 | Hirono et al. | 264—346 |
| 3,560,137 | 2/1971 | Hahn | 264—346 |
| 3,562,199 | 2/1971 | Hill, Jr., et al. | 264—346 |
| 3,201,503 | 8/1965 | Benning et al. | 264—211 |
| 3,595,951 | 7/1971 | Logullo | 264—346 |
| 3,265,800 | 8/1966 | Trunk | 264—328 |
| 3,504,080 | 3/1970 | Siggel et al. | 264—328 |
| 3,534,002 | 10/1970 | Gibbons | 260—78 UA |

ROBERT F. WHITE, Primary Examiner

G. AUVILLE, Assistant Examiner

U.S. Cl. X.R.

260—47 CZ, 65, 78 A, 78 L, 78 UA

UNITED STATES PATENT OFFICE
CERTIFICATE OF CORRECTION

Patent No. 3,840,635                 Dated  October 8, 1974

Inventor(s)   Takeo SHIMA ET AL

It is certified that error appears in the above-identified patent and that said Letters Patent are hereby corrected as shown below:

In Column 7, line 4 of Claim 4:  cancel "penyldicarboxylic"

and substitute therefor -- phenyldicarboxylic --

Signed and sealed this 7th day of January 1975.

(SEAL)
Attest:

McCOY M. GIBSON JR.　　　　　　　　C. MARSHALL DANN
Attesting Officer　　　　　　　　　　Commissioner of Patents